(12) United States Patent
Lee et al.

(10) Patent No.: US 8,237,706 B2
(45) Date of Patent: Aug. 7, 2012

(54) APPARATUS AND METHOD FOR SIMPLIFYING THREE-DIMENSIONAL MESH DATA

(75) Inventors: Suh-Ho Lee, Seongnam-si (KR);
Soo-Kyun Kim, Seoul (KR);
Joo-Kwang Kim, Yongin-si (KR);
Tae-Kyun Kim, Seongnam-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 570 days.

(21) Appl. No.: 12/348,355

(22) Filed: Jan. 5, 2009

(65) Prior Publication Data
US 2009/0174711 A1 Jul. 9, 2009

(30) Foreign Application Priority Data
Jan. 3, 2008 (KR) .................. 10-2008-0000558

(51) Int. Cl.
*G06T 17/00* (2006.01)
*G06T 15/00* (2006.01)
*G09G 5/00* (2006.01)

(52) U.S. Cl. .................. 345/420; 345/419; 345/616

(58) Field of Classification Search .................. 345/420, 345/422, 419
See application file for complete search history.

(56) References Cited

U.S. PATENT DOCUMENTS

| 6,208,347 | B1 * | 3/2001 | Migdal et al. ............ 345/419 |
| 7,298,903 | B2 * | 11/2007 | Wang et al. ............. 382/186 |
| 2005/0168460 | A1 * | 8/2005 | Razdan et al. .......... 345/419 |
| 2008/0129727 | A1 * | 6/2008 | Oh et al. ................. 345/419 |
| 2008/0205717 | A1 * | 8/2008 | Reeves et al. .......... 382/128 |

* cited by examiner

*Primary Examiner* — Hau Nguyen
*Assistant Examiner* — Leon T Cain, II
(74) *Attorney, Agent, or Firm* — Cha & Reiter, LLC

(57) ABSTRACT

An apparatus and method for simplifying 3-Dimensional (3D) mesh data are disclosed. The method includes measuring discrete curvature at each point of received 3D mesh data, calculating an error based on distance-curvature error metrics including the discrete curvature, first sorting a low curvature one of the calculated error values in a heap in ascending order, selecting a minimum error among the calculated errors, determining if the minimum error is less than a threshold, contracting an edge if the selected minimum error is greater than the threshold, and recalculating an error of a surface neighboring to a surface on which the contracted edge belongs and re-sorting the calculated error values.

20 Claims, 4 Drawing Sheets

(A) ORIGINAL MODEL (T: 5804)    (B) CONVENTIONAL QEM(QEM) (T: 120)    (C) NEW METHOD (T: 120)

(A) ORIGINAL MODEL (T: 49,998)  (B) QEM (T: 500)  (C) NEW METHOD (T: 500)

APPARATUS AND METHOD FOR SIMPLIFYING THREE-DIMENSIONAL MESH DATA

CLAIM OF PRIORITY

This application claims the benefit of the earlier filing date, under 35 U.S.C. §119(a), to that Korean Patent Application entitled "APPARATUS AND METHOD FOR SIMPLIFYING THREE-DIMENSIONAL MESH DATA" filed in the Korean Intellectual Property Office on Jan. 3, 2008 and assigned Serial No. 10-2008-0000558, the contents of which are herein incorporated by reference.

BACKGROUND OF THE INVENTION

1. Field of the Invention

The present invention relates to 3-Dimensional (3D) mesh data imaging and, more particularly, to an apparatus and method for extending a Quadric Error Metrics (QEM) algorithm by discrete curvature for simplifying 3D mesh data.

2. Description of the Related Art

With the recent progress of advanced automation and development into information society, applications of computer graphic have increased rapidly, e.g., animation, simulation, etc. Amid this, the recent introduction of 3-Dimensional (3D) graphic techniques into electronic equipments leads to paying attention to the development of a high speed graphic processing technology for processing large numbers of polygons and efficiently processing special effects, such as lighting effects, in order to configure a little more realistic graphic.

Mesh simplification is a technique to retain the original desired shape and feature of a 3D model while reducing the number of polygons necessary to render the shape and features. That is, mesh simplification refers a process of removing polygons having topological and geometrical information more than needed from an initial model, thus simplifying the initial model. A technology for simplifying such a 3D model has been utilized in many fields such as a Level of Detail (LOD) control technology of a computer animation and 3D game, a 3D graphic solution of the Internet, a real-time 3D graphic simulation, etc.

A goal of mesh simplification is to provide good approximation to retain geometrical information on the original model and a phase with less vertex and face. An advantage of mesh simplification is to reduce the amount of storage space required for rendering a large size model, reduce a data-structure building time, and visualize a model at high speed.

A conventional simplification algorithm can give rise to a change of a volume of the original mesh model during the simplification process. Performance of the mesh simplification algorithm depends on an execution time for simplifying the original mesh model and a quality of approximation of the simplified model. Thus, a volume of a simplified mesh model has been considered using a distance based QEM algorithm of several simplification algorithms that uses the sum of squares of distances from one point on a plane providing relatively good performance.

The QEM algorithm is an algorithm for simplifying a mesh model using iterative edge contraction in which a method of selecting an edge to contract is of importance. The QEM algorithm determines a vertex whose distance error is minimal at each edge as a position of a new vertex after edge contraction, using a cost function of prioritizing an edge to contract (i.e., so-called QEM), first selects an edge at which the vertex has the least distance error among edges, and contracts the selected edge.

However, the QEM algorithm performs quick and high quality simplification, but there is a problem that it cannot keep a feature of the original 3D model when completing a simplification step of simplifying the original 3D model.

SUMMARY OF THE INVENTION

According to one aspect of the present invention, a method for simplifying 3-Dimensional (3D) mesh data in an electronic equipment is provided. The method includes measuring discrete curvature at each point in said 3D mesh data, calculating an error based on distance-curvature error metrics comprising the discrete curvature measured at each point, selecting a minimum error among the calculated errors, contracting a corresponding edge of said 3D when the minimum error is more than the threshold to obtain a simplified version of said edge, recalculating an error of a surface neighboring to a surface on which the contracted edge belongs, and re-sorting said calculated error values.

According to another aspect of the present invention, an apparatus for simplifying 3-Dimensional (3D) mesh data is provided. The apparatus includes a controller and a graphic engine. The controller controls a function of measuring discrete curvature at each point, calculating an error based on distance-curvature error metrics including the measured discrete curvature, first sorting a low curvature one of the calculated error values of respective points in ascending order, determining if a minimum error among the calculated errors is less than a threshold, contracting an edge if the minimum error is more than the threshold, recalculating an error of a surface neighboring to a surface on which the edge contracts, and re-sorting the calculated errors. The graphic engine performs simplification by contracting an edge of the 3D mesh data under control of the controller.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

Exemplary embodiments of the present invention will be described herein below with reference to the accompanying drawings. In the following description, well-known functions or constructions are not described in detail as they would obscure the invention in unnecessary detail.

Figure 1:
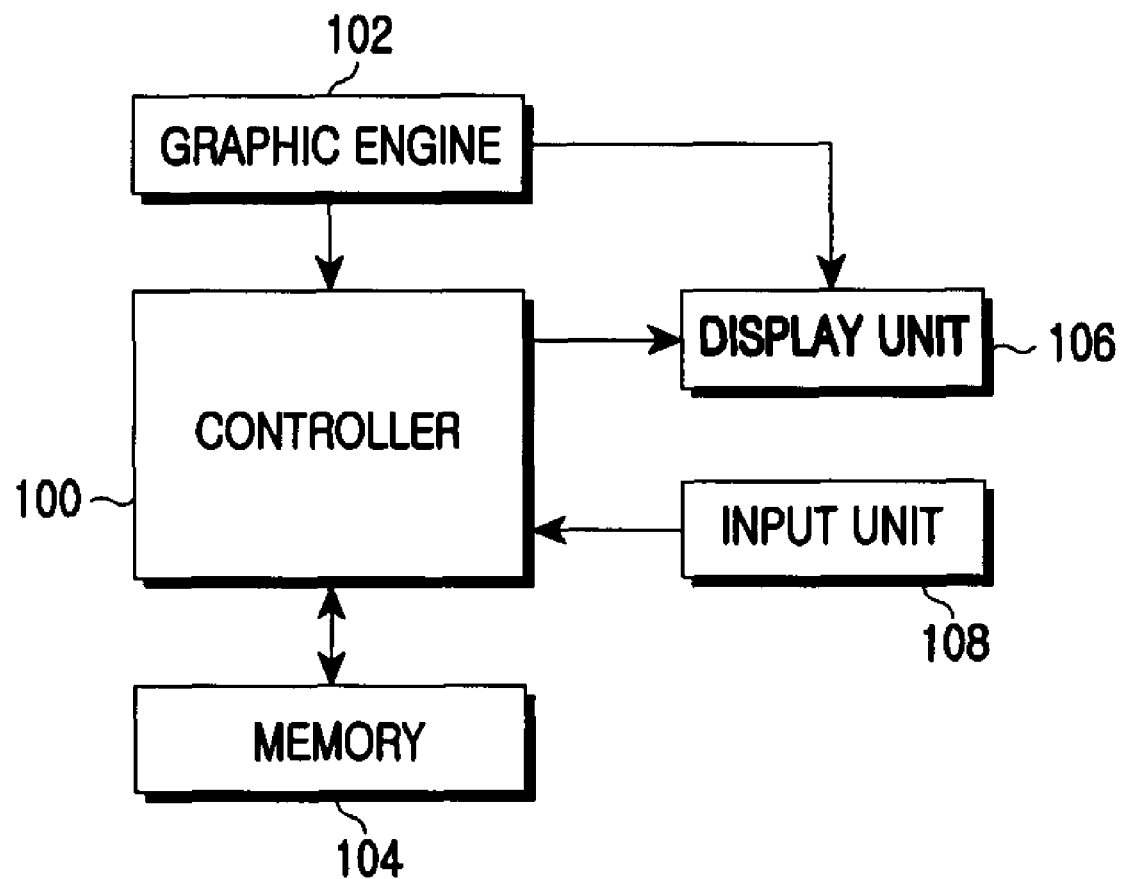
FIG. 1 is a block diagram illustrating a construction of an apparatus for simplifying 3-Dimensional (3D) mesh data according to an exemplary embodiment of the present invention.

FIG. 1 is a block diagram illustrating a construction of an apparatus for simplifying 3-Dimensional (3D) mesh data according to an exemplary embodiment of the present invention.

In this case, the apparatus refers to a plurality of equipments for processing graphic such as a portable terminal, a personal computer, a mobile communication terminal, etc. or may represent one component or equipment among the plurality of the graphic processing equipments.

Referring to FIG. 1, the apparatus includes a controller 100, a graphic engine 102, a memory 104, a display unit 106, and an input unit 108.

The controller 100 controls a general operation of the apparatus and in addition to a general function, controls and processes a function of receiving 3D mesh data, measuring discrete curvature, measuring an error based on distance and curvature, first sorting and simplifying a middle point having less error, and providing an output to the display unit 106 according to an exemplary embodiment of the present invention.

Under control of the controller 100, the graphic engine 102 measures discrete curvature of the received 3D mesh data, measures an error based on distance and curvature, first sorts and simplifies a point having less error, and provides an output to the controller 100. The graphic engine 102 also directly outputs simplified 3D mesh data to the display unit 106.

The memory 104 stores a program for controlling a general operation of the electronic equipment, temporary data generated during an operation of the electronic equipment, a system parameter, and other depository data. In particular, the memory 104 stores a program for simplifying 3D mesh data. Memory 104 may be composed of well-known memory types such a PROM, RAM, and/or Flash.

The display unit 106 displays state information generated during an operation of the apparatus, and limited number of numerals and characters. The display unit 128 outputs a simplification model whose feature is preserved according to an exemplary embodiment of the present invention.

The input unit 108 includes keys for receiving numeral or character information and function keys for setting various kinds of functions, and outputs functions corresponding to the keys pressed by a user to the controller 100.

Figure 2:
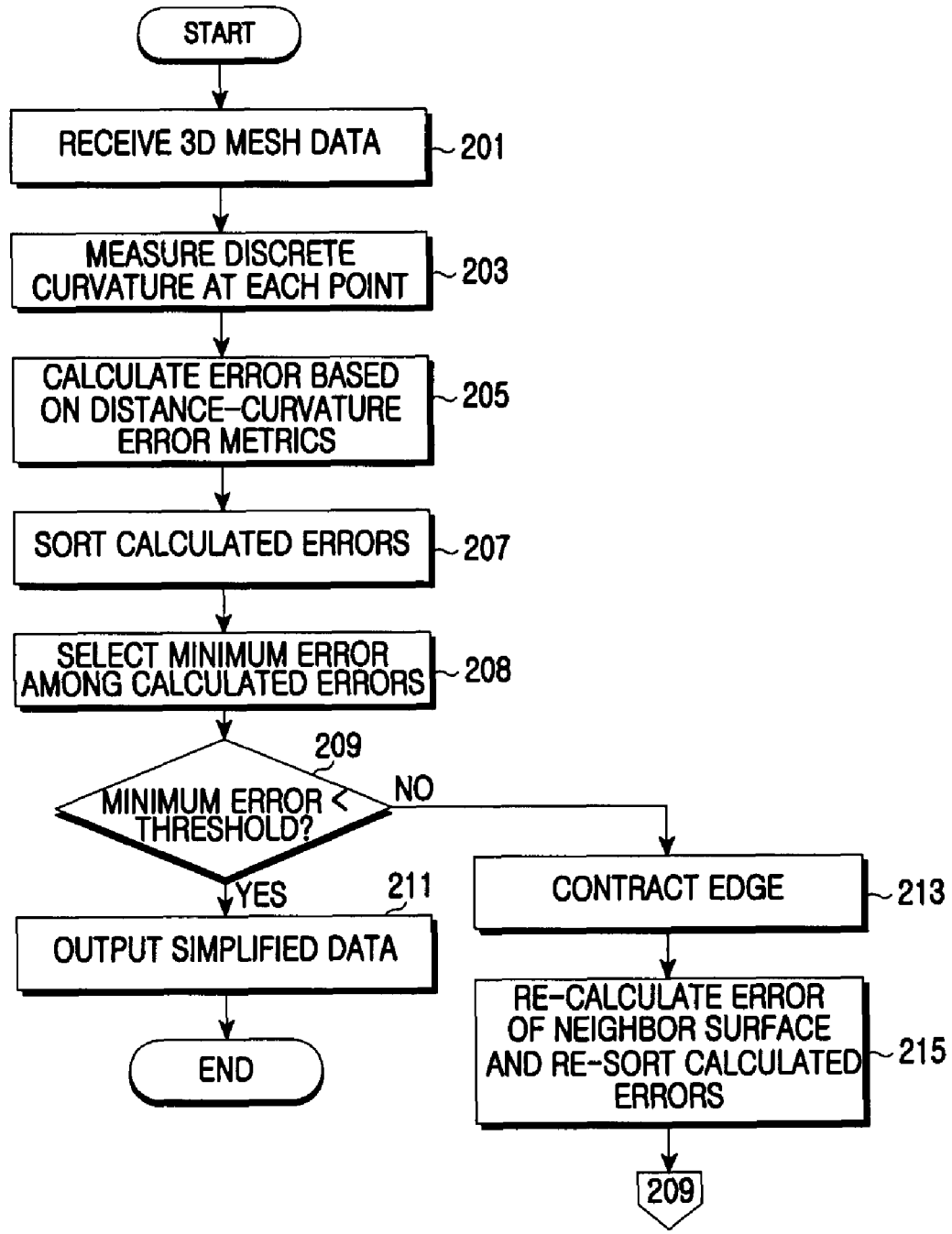
FIG. 2 is a flow diagram illustrating a process of simplifying 3D mesh data in according to an exemplary embodiment of the present invention.

FIG. 2 is a flow diagram illustrating a process of simplifying 3D mesh data according to an exemplary embodiment of the present invention.

Referring to FIG. 2, upon receiving 3D data in step 201, measurement of discrete curvature is performed at each point at step 203. The discrete curvature, a surface curvature of mesh constituted of a discrete surface, is calculated using geometrical information on the mesh. As the discrete curvature, there are an average curvature, a Gaussian curvature, and a principal curvature, and each curvature has a different characteristic.

Then, in step 205, an error is calculated based on distance-curvature error metrics and then, in step 207, a sort of the calculated errors.

Then, in step 208, a minimum error is selected from among the errors and then, in step 209, a determination is made whether the minimum error is less than a threshold value. If the minimum error is less than the threshold, in step 213, an edge of a vertex is contracted and in step 215, an error of a surface neighboring to a surface on which the edge contracts, is recalculated the calculated errors are resorted. Then, processing returns to step 209 and again performs the processing steps illustrated.

If the minimum error is less than the threshold value, then in step 211, the simplified data is outputted and processing is terminated according to the illustrated exemplary embodiment of the present invention.

With regard to the error calculation, a distance from one point on a plane of a triangular mesh is measured and the measured distance is used as an error, and is given in Equation 1 as:

$$d(\bar{v},p_i)=n_i\cdot\bar{v}+c_i \qquad (1)$$

wherein $d(\bar{v},p_i)$ represents a distance from a new vertex $\bar{v}=(\bar{v}_x, \bar{v}_y, \bar{v}_z)$ on a plane $(p_i)$, and $n=(n_{ix}, n_{iy}, n_{iz})$ represents a vector of the plane $(p_i)$.

Discrete curvature for the vertex $\bar{v}=(\bar{v}_x, \bar{v}_y, \bar{v}_z)$ represents a curved degree at the vertex.

An error obtained using the discrete curvature is substituted for $c_i$ in Equation 1. By the thus measured numerical value, a distance error (i.e., QEM) is extended into distance-curvature error metrics including discrete curvature(s). The distance-curvature error metrics change a sequence (order) of a heap to simplify a high curvature part last and simplify a low curvature part (i.e., a flat part) first by changing a sequence of the computed errors. For example, an error is measured by measuring discrete curvatures at vertexes $(v_1)$ and $(v_2)$ in Equation 2 and substituting the thus measured values in Equation 3.

$$H_{1,2} = \frac{\sum_{j=0}^{n}\{((v_{j-1}-v_{1,2})\times(v_j-v_{1,2}))\cdot((v_{j+1}-v_{1,2})\times(v_j-v_{1,2}))\}}{\sum_{i=0}^{n}\|(v_j-v_{1,2})\times(v_{j+1}-v_{1,2})\|} \qquad (2)$$

$$\sum_{i,j=1}^{n} d(\bar{v},p_{i,j}) = \sum_{i,j=1}^{n} n_{i,j}\cdot\bar{v}+(c_{i,j}+H_1+H_2)$$

$$Q_e(\bar{v}) = \sum_{i,j=1}^{n} d(\bar{v},p_{i,j})^2 \qquad (3)$$

The error obtained from Equations 2 and 3 is put in a heap for simplification and, among error values, an error value of a high curvature part moves to a rear part of the heap. By doing so, simplification is, although much, done with a feature of the original 3D mesh data that is preserved.

Figure 3:
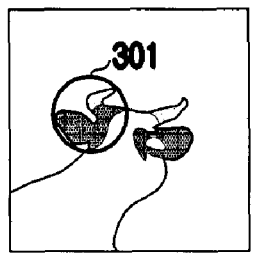
FIG. 3 is a diagram illustrating simplified data according to an exemplary embodiment of the present invention.
Figure 3:
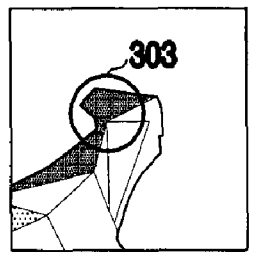
Figure 3:
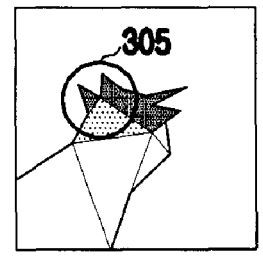

FIG. 3 is a diagram illustrating simplified data according to an exemplary embodiment of the present invention.

Figure 4:
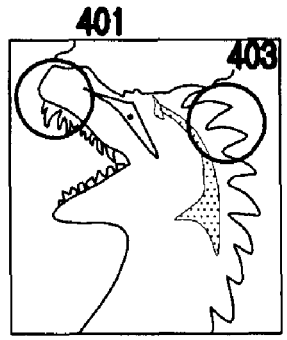
FIG. 4 is a diagram illustrating simplified data according to an exemplary embodiment of the present invention.
Figure 4:
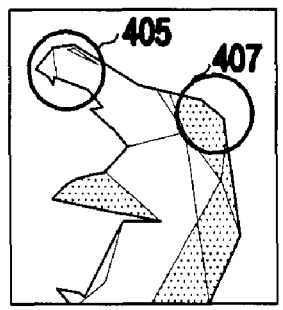
Figure 4:
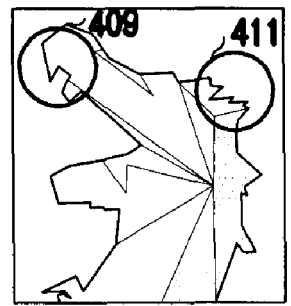

Referring to FIG. 3, upon simplification, a conventional QEM method expresses a part 301 of the original 3D mesh data model like a part 303 (see FIG. 3(B)). However, in the exemplary embodiment of the present invention received herein, if a high curvature part is simplified last, simplification is performed with a feature preserved like a part 305 (see FIG. 3(C)). In FIG. 3, "T" denotes number of triangles marked on a model. FIG. 4 is a diagram illustrating simplified data according to an exemplary embodiment of the present invention.

Referring to FIG. 4, upon simplification, a conventional QEM method expresses parts 401 and 403 (see FIG. 4(A)), of the original 3D mesh data model a represented by parts 405 and 407 (see FIG. 4(B)). In an exemplary embodiment of the present invention, if a high curvature part is simplified last, simplification is performed with a feature preserved like parts 409 and 411. (see FIG. 4(c)). In FIG. 4, "T" denotes number of triangles marked on a model.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, an exemplary embodiment of the present invention has an effect of, upon simplification of 3D mesh data, being able to first simplify a specific part of the 3D mesh data model and thus increase the accuracy of a contour and a shape of the simplified model, by extending a QEM algorithm by discrete curvature and simplify a high discrete curvature part last.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method, operable in processor system, for simplifying 3-Dimensional (3D) mesh data of a mesh by reducing a number of triangles of the mesh, the method comprising:
   (a) measuring discrete curvature at each point in said 3D mesh data;
   (b) calculating errors based on distance-curvature error metrics comprising the discrete curvature measured at each point, and sorting the calculated errors in a heap, with errors of relatively high curvature parts of the mesh placed in a rear part of the heap;
   (c) selecting a minimum error among the calculated errors;
   (d) contracting an edge of said 3D mesh data corresponding to the minimum error when the minimum error is less than a threshold to obtain a simplified version of said mesh with the number of triangles of an entire mesh area reduced;
   (e) recalculating an error of a surface neighboring a surface to which the contracted edge belongs;
   (f) re-sorting said calculated errors in the heap; and
   repeating steps (c) through (f) until the minimum error is not less than the threshold, whereby simplification of the relative high curvature parts of the mesh is done last.

2. The method of claim 1, further comprising, if the selected minimum error is not less than the threshold, outputting said simplified 3D data.

3. The method of claim 1, wherein the discrete curvature is at least one of an average curvature, a Gaussian curvature, and a principal curvature.

4. The method of claim 1, wherein the threshold is a user input value.

5. An apparatus for simplifying 3-Dimensional (3D) mesh data of a mesh by reducing a number of triangles of the mesh, the apparatus comprising:
   a controller for controlling a function of:
   (a) measuring discrete curvature at each point,
   (b) calculating errors based on distance-curvature error metrics comprising the measured discrete curvature, and sorting the calculated errors in a heap, with errors of relatively high curvature parts of the mesh placed in a rear part of the heap,
   (c) selecting a minimum error among the calculated errors,
   (d) contracting an edge if the minimum error is less than a threshold to obtain a simplified representation of said mesh with the number of triangles of an entire mesh area reduced,
   (e) recalculating an error of a surface neighboring a surface on which the edge contracts,
   (f) re-sorting said errors in the heap; and
   repeating steps (c) through (f) until the minimum error is not less than the threshold, whereby simplification of the relative high curvature parts of the mesh is done last; and
   a graphic engine for displaying said simplified 3D mesh data.

6. The apparatus of claim 5, wherein the controller controls a function of providing the simplified data to said graphic engine when the selected minimum error is not less than the threshold.

7. The apparatus of claim 5, wherein the discrete curvature is at least one of an average curvature, a Gaussian curvature, and a principal curvature.

8. The apparatus of claim 5, wherein the threshold is a user input value.

9. The method of claim 1, wherein the processor system is at least one of a plurality of equipments selected from the group consisting of: a portable terminal, a mobile communication terminal, and a personal computer.

10. The apparatus of claim 5, wherein the apparatus is at least one of a plurality of equipments selected from the group consisting of: a portable terminal, a mobile communication terminal, and a personal computer.

11. The method of claim 1, wherein the error based on the distance-curvature error metrics comprising the discrete curvature measured at each point is calculated as:

$$d(\overline{v},p_i)=n_i\cdot\overline{v}+c_i \quad (4)$$

where,
$d(\overline{v},p_i)$: distance from new vertex $\overline{v}=(\overline{v}_x, \overline{v}_y, \overline{v}_z)$ on plane $(p_i)$,
$n=(n_{ix}, n_{iy}, n_{iz})$: vector of plane $(p_i)$, and
$c_i$: distance-curvature error comprising discrete curvature.

12. The method of claim 11, wherein the distance-curvature error comprising the discrete curvature is calculated as:

$$H_{1,2} = \frac{\sum_{j=0}^{n}\{((v_{j-1}-v_{1,2})\times(v_j-v_{1,2}))\cdot((v_{j+1}-v_{1,2})\times(v_j-v_{1,2}))\}}{\sum_{i=0}^{n}\|(v_j-v_{1,2})\times(v_{j+1}-v_{1,2})\|} \quad (5)$$

where, v: vertex.

13. The apparatus of claim 5, wherein the error based on the distance-curvature error metrics comprising the discrete curvature measured at each point is calculated as:

$$d(\overline{v},p_i)=n_i\cdot\overline{v}+c_i \quad (6)$$

where,
$d(\overline{v},p_i)$ distance from new vertex $\overline{v}=(\overline{v}_x, \overline{v}_y, \overline{v}_z)$ on plane $(p_i)$,
$n=(n_{ix}, n_{iy}, n_{iz})$: vector of plane $(p_i)$, and
$c_i$: distance-curvature error comprising discrete curvature.

14. The apparatus of claim 13, wherein the distance-curvature error comprising the discrete curvature is calculated as:

$$H_{1,2} = \frac{\sum_{j=0}^{n}\{((v_{j-1}-v_{1,2})\times(v_j-v_{1,2}))\cdot((v_{j+1}-v_{1,2})\times(v_j-v_{1,2}))\}}{\sum_{i=0}^{n}\|(v_j-v_{1,2})\times(v_{j+1}-v_{1,2})\|} \quad (7)$$

where, v: vertex.

15. A computer readable, non-transitory recording medium for simplifying 3-Dimensional (3D) mesh data of a mesh by reducing a number of triangles of the mesh, the recording medium including code which when accessed and executed by a processor causes the processor to:
 (a) measure discrete curvature at each point in said 3D mesh data;
 (b) calculate errors based on distance-curvature error metrics comprising the discrete curvature measured at each point, and sorting the calculated errors in a heap, with errors of relatively high curvature parts of the mesh placed in a rear part of the heap;
 (c) select a minimum error among the calculated errors;
 (d) contract an edge of said 3D mesh data corresponding to the minimum error when the minimum error is less than a threshold to obtain a simplified version of said mesh with the number of triangles of an entire mesh area reduced;
 (e) recalculate an error of a surface neighboring a surface to which the contracted edge belongs;
 (f) re-sort said calculated errors in the heap; and
 repeat steps (c) through (f) until the minimum error is not less than the threshold, whereby simplification of the relative high curvature parts of the mesh is done last.

16. The recording medium of claim 15, wherein said processor further outputs said simplified 3D data, when said selected minimum error is not less than the threshold.

17. The recording medium of claim 15, wherein the discrete curvature is at least one of an average curvature, a Gaussian curvature, and a principal curvature.

18. The recording medium of claim 15, wherein the threshold is a user input value.

19. The recording medium of claim 15, wherein the error based on the distance-curvature error metrics comprising the discrete curvature measured at each point is calculated as:

$$d(\overline{v}, p_i) = n_i \cdot \overline{v} + c_i \quad (4)$$

where,
$d(\overline{v}, p_i)$ distance from new vertex $\overline{v} = (\overline{v}_x, \overline{v}_y, \overline{v}_z)$ on plane $(p_i)$,
$n = (n_{ix}, n_{iy}, n_{iz})$: vector of plane $(p_i)$, and
$c_i$: distance-curvature error comprising discrete curvature.

20. The recording medium of claim 19, wherein the distance-curvature error comprising the discrete curvature is calculated as:

$$H_{1,2} = \frac{\sum_{j=0}^{n} \{((v_{j-1} - v_{1,2}) \times (v_j - v_{1,2})) \cdot ((v_{j+1} - v_{1,2}) \times (v_j - v_{1,2}))\}}{\sum_{i=0}^{n} \|(v_j - v_{1,2}) \times (v_{j+1} - v_{1,2})\|} \quad (5)$$

where, v: vertex.

* * * * *

UNITED STATES PATENT AND TRADEMARK OFFICE
CERTIFICATE OF CORRECTION

PATENT NO. : 8,237,706 B2
APPLICATION NO. : 12/348355
DATED : August 7, 2012
INVENTOR(S) : Suh-Ho Lee et al.

It is certified that error appears in the above-identified patent and that said Letters Patent is hereby corrected as shown below:

In the Claims:

Column 8, Claim 19, Line 9 should read as follows:

--... $d(\bar{v}, p_i) = n_i \cdot \bar{v} + c_i$ .................(4) ...--

Signed and Sealed this
Eighteenth Day of June, 2013

Teresa Stanek Rea
*Acting Director of the United States Patent and Trademark Office*